(12) United States Patent
Hashimoto

(10) Patent No.: US 9,104,072 B2
(45) Date of Patent: Aug. 11, 2015

(54) LIQUID CRYSTAL DEVICE

(75) Inventor: Nobuyuki Hashimoto, Saitama (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 9 days.

(21) Appl. No.: 13/994,733

(22) PCT Filed: Dec. 20, 2011

(86) PCT No.: PCT/JP2011/079533
§ 371 (c)(1),
(2), (4) Date: Jun. 15, 2013

(87) PCT Pub. No.: WO2012/086649
PCT Pub. Date: Jun. 28, 2012

(65) Prior Publication Data
US 2013/0265536 A1 Oct. 10, 2013

(30) Foreign Application Priority Data
Dec. 20, 2010 (JP) .................. 2010-283226

(51) Int. Cl.
*G02F 1/133* (2006.01)
*G02F 1/1339* (2006.01)
*G02F 1/1333* (2006.01)
(Continued)

(52) U.S. Cl.
CPC .............. *G02F 1/1339* (2013.01); *G02B 1/118* (2013.01); *G02C 7/083* (2013.01); *G02F 1/13392* (2013.01); *G02F 1/13394* (2013.01); *G02F 1/133377* (2013.01); *G02F 1/133502* (2013.01); *G02C 2202/20* (2013.01); *G02F 1/133526* (2013.01); *G02F 2001/133388* (2013.01); *G02F 2001/133565* (2013.01);
(Continued)

(58) Field of Classification Search
USPC ........................................................ 349/158
See application file for complete search history.

(56) References Cited

U.S. PATENT DOCUMENTS 6,707,518 B1 * 3/2004 Cowan .......................... 349/113
2006/0215103 A1 9/2006 Miyashita et al.

FOREIGN PATENT DOCUMENTS

| CN | 1841168 A | 10/2006 |
|----|-----------|---------|
| JP | S61-205916 A | 9/1986 |

(Continued)

OTHER PUBLICATIONS

EPO, European Search Report for EP Patent Application No. 11850828.2, Jun. 14, 2014.
(Continued)

*Primary Examiner* — Phu Vu

(57) ABSTRACT

The present invention is directed to the provision of a liquid crystal device constructed by sealing a liquid crystal material between substrates, wherein provisions are made to prevent reflections at the sealing, thereby achieving excellent transparency. The liquid crystal device includes a first substrate disposed on a viewing side, a second substrate disposed opposite the first substrate, a sealing member disposed between the first substrate and the second substrate, a liquid crystal layer provided between the first substrate and the second substrate and sealed by the sealing member, and a muslin structure or moth-eye structure placed between the first substrate and the sealing member. The muslin structure or moth-eye structure serves to form a smooth refractive index gradient between the sealing member and the first transparent substrate, thereby enhancing the transparency of the liquid crystal device.

7 Claims, 11 Drawing Sheets

(51) Int. Cl.
G02C 7/08 (2006.01)
G02F 1/1335 (2006.01)
G02B 1/118 (2015.01)
G02F 1/29 (2006.01)

(52) U.S. Cl.
CPC ...... *G02F 2001/294* (2013.01); *G02F 2201/38* (2013.01); *G02F 2203/28* (2013.01)

(56) References Cited

FOREIGN PATENT DOCUMENTS

| JP | H06-095130 A | 4/1994 |
|----|---|---|
| JP | 2002-286906 A | 10/2002 |
| JP | 2004-117540 A | 4/2004 |
| JP | 2004-287238 A | 10/2004 |
| JP | 2007-304452 A | 11/2007 |
| JP | 2008-310188 A | 12/2008 |
| JP | 2010-271488 A | 12/2010 |

OTHER PUBLICATIONS

International Search Report for PCT/JP2011/079533, Feb. 21, 2012.
State Intellectual Property Office of the People'S Republic of China, Office Action for Chinese Patent Application No. CN201180060758.9, Mar. 18, 2015.

\* cited by examiner

LIQUID CRYSTAL DEVICE

TECHNICAL FIELD

The present invention relates to a liquid crystal device having excellent transparency, and more specifically to the structure of a liquid crystal device that achieves excellent transparency by making provisions to prevent reflections at sealed portions when sealing a liquid crystal layer between two substrates by placing a sealing member therebetween.

BACKGROUND

It is known in the art to provide a liquid crystal device constructed by placing a sealing member between two substrates and sealing a liquid crystal layer therebetween, wherein provisions are made such that, during transmission of visible light through the liquid crystal device, the visible light transmittance of both the liquid crystal device and its sealing frame is set high, while at the same time, the difference in haze value between the liquid crystal device and the sealing frame is held small (for example, patent document 1).

The above liquid crystal device can be made completely transparent, including its sealing frame, and thus it is possible to provide a liquid crystal device having an excellent exterior design, since its external appearance is not impaired even if the sealing frame is not covered with a case or the like. This makes it possible to use the liquid crystal device applications such as show windows, bulletin boards, automotive instrument panels, etc., that can display characters and patterns.

FIG. 19 is a cross-sectional view of the prior art liquid crystal device disclosed in patent document 1.

As shown in FIG. 19, the liquid crystal device 200 includes a pair of first and second transparent substrates 201 and 202, a sealing member 204 placed therebetween, and a liquid crystal layer 203 sealed within a space enclosed by the sealing member 204.

In the liquid crystal device 200, the liquid crystal layer 203 is a composite layer made of a liquid crystal and a curing material, theoretically has a high light transmittance, and is suitable for such applications as show windows, bulletin boards, etc., that can display characters and patterns. The first transparent substrate 201 has a larger surface area than the second transparent substrate 202, and the liquid crystal layer 203 is formed only in an area that needs to be provided with the function of displaying characters and patterns.

A plurality of transparent electrodes 210 are formed in a stripe pattern on the inner surface of the first transparent substrate 201. Similarly, a plurality of transparent electrodes 210 are formed in a stripe pattern on the inner surface of the second transparent substrate 202. The plurality of transparent electrodes 210 on the inner surface of the first transparent substrate 201 and the plurality of transparent electrodes 210 on the inner surface of the second transparent substrate 202 together form a matrix of electrodes. An insulating film and an alignment film, not shown, are formed on each electrode array 210.

Cell gap is controlled by uniformly dispersing spacers 206 throughout the space enclosed by the first and second transparent substrates 201 and 202 and sealed by the sealing member 204. The sealing member 204 is disposed between the first and second transparent substrates 201 and 202 in such a manner to form a frame around the periphery of the first transparent substrate 201. The first and second transparent substrates 201 and 202 are bonded together by the sealing member 204.

If the selected sealing member 204 is tinted, or the visible light transmittance of the material is low, the sealing member may become visible, which may degrade the external appearance or could lead to an exterior design problem. When using the liquid crystal device 200 in such applications as show windows, bulletin boards, automotive instrument panels, etc., there are cases where the portions bonded by the sealing member 204 may not be able to be neatly hidden by means of a frame or a case. According to the method proposed in patent document 1 to solve such problems, the visible light transmittance of the sealing member 204 is set to 70% or higher, or the difference between the haze value of the sealing member 204 and the haze value of the liquid crystal layer 203 during transmission of visible light is held to within ±3%.

PRIOR ART DOCUMENT

Patent Document

Patent document 1: Japanese Unexamined Patent Publication No. 2008-310188 (page 4, FIG. 1)

SUMMARY

Patent document 1 describes that transparency is an important consideration in selecting the material for the sealing member as well as selecting the material for the liquid crystal layer, and claims that the sealing member as well as the liquid crystal layer must be provided with a visible light transmittance of 70% or higher, and also that the difference in haze value between the sealing member and the liquid crystal layer must be held to within ±3%.

While sealing materials having the required transparency are available, the number of such types of sealing materials is limited. Furthermore, since the affinity for the liquid crystal material and the adhesion to the substrate have also to be considered, the disadvantage is that the number of selectable materials is extremely small. There has also been the problem that reflections occur at the bonding interface between the transparent substrate and the sealing member, causing the interface to look like a shadow, because incident light experiences an abrupt change from the refractive index of the transparent substrate to the refractive index of the sealing member across the interface.

It is an object of the present invention to provide a liquid crystal device that can solve the above problems.

It is another object of the present invention to provide a liquid crystal device that can eliminate the shadow of the bonding interface by making provisions to prevent the occurrence of reflections at the interface between the transparent substrate and the sealing member without relaying on the material of the sealing member.

Since provisions are made to eliminate reliance on the material of the sealing member and thereby enlarge the range of selection for the sealing member, it is a further object of the present invention to provide a liquid crystal device having enhanced transparency by using a sealing member having high transparency and a high affinity for the transparent substrate.

A liquid crystal device according to the present invention includes a first substrate disposed on a viewing side, a second substrate disposed opposite the first substrate, a sealing member disposed between the first substrate and the second substrate, a liquid crystal layer provided between the first substrate and the second substrate and sealed by the sealing member, and a muslin structure or moth-eye structure placed between the first substrate and the sealing member.

Preferably, the liquid crystal device further includes an additional muslin structure or moth-eye structure which is placed between the sealing member and the second substrate.

Preferably, the liquid crystal device further includes an optical structure which is provided on the first substrate or the second substrate on a side thereof that faces the liquid crystal layer.

Preferably, in the liquid crystal device, the optical structure is formed from the same resin material as the muslin structure or moth-eye structure.

Preferably, in the liquid crystal device, the first substrate or the second substrate is a resin substrate, and the muslin structure or moth-eye structure is formed by processing the resin substrate.

Preferably, in the liquid crystal device, the muslin structure or moth-eye structure is formed integrally with the first substrate or the second substrate.

Preferably, the liquid crystal device further includes an additional muslin structure or moth-eye structure which is provided in a region defined between the first substrate and the second substrate and located outside the sealing member.

In the above liquid crystal device, by providing the muslin structure or moth-eye structure between the substrate and the sealing member, a smooth refractive index gradient can be formed. This serves to prevent the occurrence of reflections at the bonding interface between the substrate and the sealing member. Since the shadow of the bonding interface can thus be eliminated, it is possible to provide a liquid crystal device having enhanced transparency.

In the above liquid crystal device, since the muslin structure or moth-eye structure can be formed simultaneously with the optical structure from the same resin material between the substrates, the fabrication process can be simplified, and the liquid crystal device provided with the muslin structure or moth-eye structure can be achieved at low cost.

BRIEF DESCRIPTION OF THE DRAWINGS

FIG. 13(*b*) is a diagram for explaining the substrate fabrication process.

FIG. 13(*c*) is a diagram for explaining the substrate fabrication process.

FIG. 13(*d*) is a diagram for explaining the substrate fabrication process.

FIG. 14(*b*) is a diagram for explaining the alternative substrate fabrication process.

DESCRIPTION OF EMBODIMENTS

Liquid crystal devices will be described below with reference to the drawings. However, the technical scope of the present invention is not limited to the specific embodiments described herein but extends to the inventions described in the appended claims and their equivalents.

Figure 1:
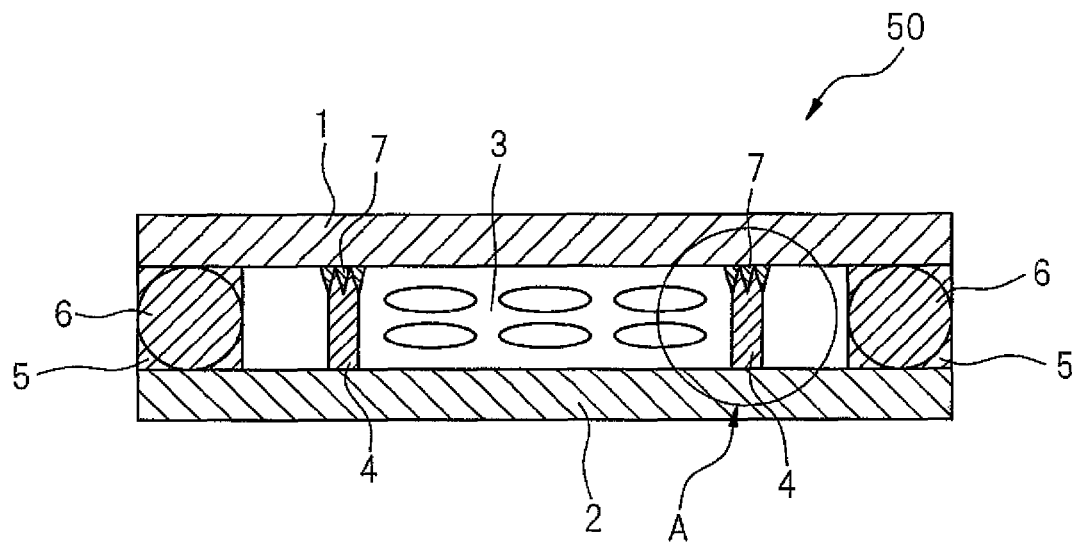
FIG. 1 is a cross-sectional view of a liquid crystal device 50.

FIG. 1 is a cross-sectional view of a liquid crystal device 50.

As shown in FIG. 1, the liquid crystal device 50 is constructed by sealing a liquid crystal layer 3 inside an interior space sandwiched between first and second substrates 1 and 2 of the same material and enclosed by a first sealing member 4 containing no spacers. A second sealing member 5 containing spacers 6 is placed outside the first sealing member 4 in such a manner as to enclose the first sealing member 4. Though not shown here, a protective film, a transparent electrode, and an alignment film are formed on each of the first and second substrates 1 and 2. In the example of FIG. 1, the first and second substrates 1 and 2 are identical in size, but in a modified example, the first and second substrates may have different sizes.

The cell gap between the first and second substrates 1 and 2 is controlled to maintain a uniform spacing therebetween by the spacers 6 contained in the second sealing member 5; here, the spacers 6 can be chosen to have a suitable diameter according to the purpose. The liquid crystal device 50 is constructed using two kinds of sealing members, the first sealing member 4 containing no spacers 6 and the second sealing member 5 containing the spacers 6. However, depending on the purpose or the method of fabrication, the first sealing member 4 may contain spacers or may not contain any spacers.

Figure 2:
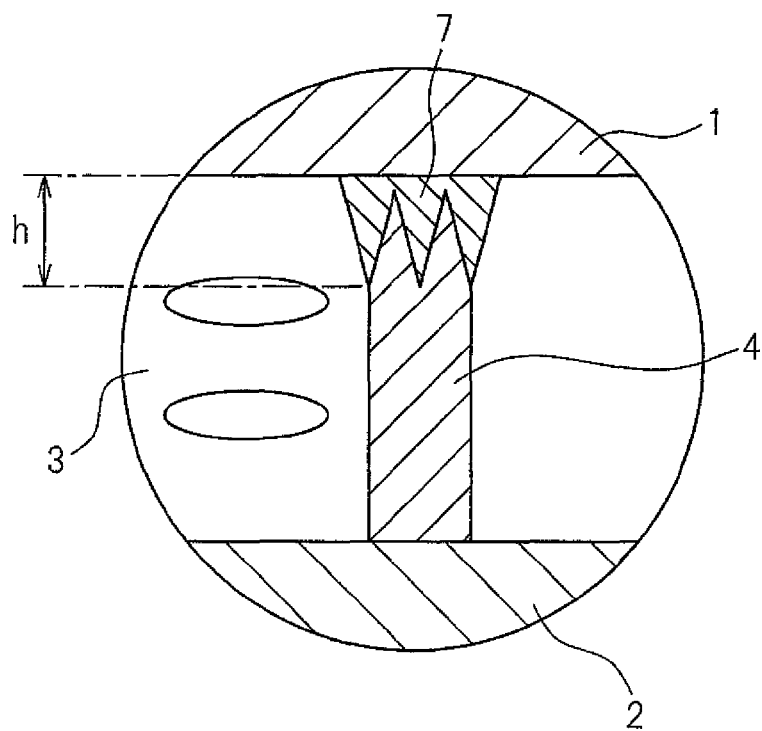
FIG. 2 is an enlarged view of the interface between a first transparent substrate and sealing member indicated at A in FIG. 1.
Figure 3:
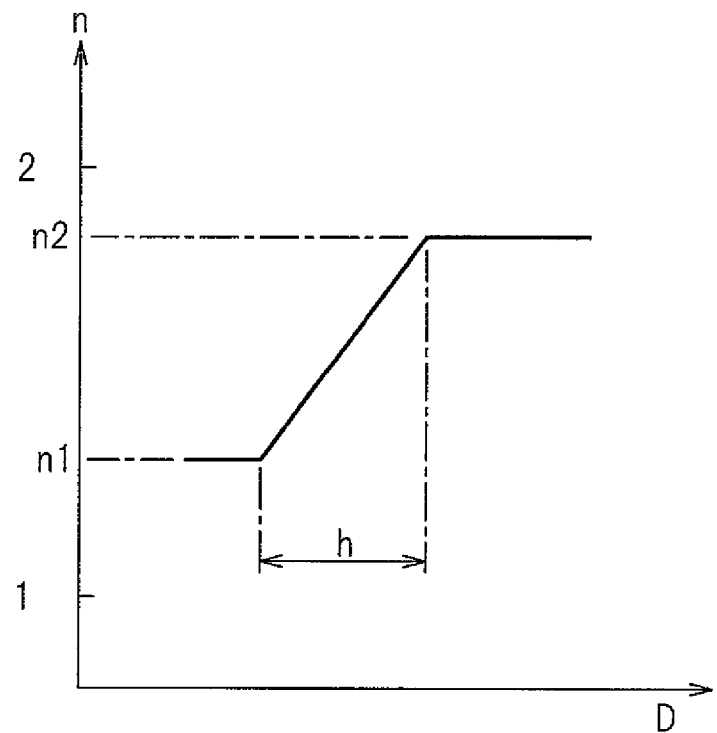
FIG. 3 is a graph depicting how the refractive index changes across the interface between the first transparent substrate and sealing member shown in FIG. 1.

FIG. 2 is an enlarged view of a cross section of the bonding interface between the first transparent substrate 1 and the first sealing member 4 in the liquid crystal device 50 indicated at A in FIG. 1, and FIG. 3 is a graph depicting how the refractive index changes across the bonding interface between the first transparent substrate 1 and the first sealing member 4. In FIG. 3, the ordinate represents the refractive index (n), and the abscissa represents the distance (D) that the light incident on the first transparent substrate travels until it enters the sealing member.

The optical properties of a moth-eye structure 7 will be described below.

The moth-eye structure 7 is provided between the first transparent substrate 1 and the first sealing member 4. The protrusion height of the moth-eye structure 7 is denoted by h, and the refractive index thereof is denoted by n1. The refractive index of the first transparent substrate 1 is denoted by n1, and the refractive index is constant throughout the first transparent substrate 1. The refractive index of the first sealing member 4 is denoted by n2, and the refractive index is constant throughout the first sealing member 4.

Visible light incident on the first transparent substrate 1 passes through the first transparent substrate 1 of refractive index n1, then through the moth-eye structure 7 which is a micro-optical structure of refractive index n1, and then enters the first sealing member 4 of refractive index n2. A smooth refractive index gradient transitioning from the refractive index n1 to the refractive index n2 is formed across the protrusion height, h, of the moth-eye structure 7, thus exhibiting a nonreflective property. When seen from the first transparent substrate 1 side, the shadow of the bonding interface between the first transparent substrate 1 and the first sealing member 4 is invisible, which serves to enhance the transparency of the liquid crystal device 50.

A structure whose dimension is approximately equal to one-half wavelength of light makes it possible for the structure to be invisible from the light, and the refractive index can be considered as having been averaged through the structure. For example, when the moth-eye structure 7 (or a muslin structure), whose height, h, is equal to or less than one-half wavelength of light, is constructed from a resin having a periodic triangular structure, as shown in FIG. 2, the refractive index of the structure is approximately equal to the average refractive index of the sealing member 4 and the moth-eye structure 7. That is, the refractive index at the top of the moth-eye structure 7 is approximately equal to the refractive index of the sealing member, while the refractive index at the bottom of the moth-eye structure 7 is approximately equal to the refractive index of the moth-eye structure 7. On the other hand, the portion between the top and bottom of the moth-eye structure 7 exhibits an average refractive index proportional to the volume ratio between the moth-eye structure 7 and the sealing member 4. It therefore follows that, through the portion between the top and bottom of the moth-eye structure 7, the refractive index progressively transitions from the refractive index n1 of the moth-eye structure 7 to the refractive index n2 of the sealing member 4, as shown in FIG. 3.

Preferably, the ratio of the base (the length of the periodic structure) to the height of the triangular structure of the moth-eye structure 7 (i.e., the aspect ratio) is about 1:1 when the difference in refractive index between the moth-eye structure 7 and the sealing member 4 is 0.1. Also preferably, the aspect ratio of the moth-eye structure 7 is about 1:3 to 1:5 when the difference in refractive index between the moth-eye structure 7 and the sealing member 4 is 1.5.

In the liquid crystal device 50, the moth-eye structure 7 is provided inside the space sandwiched between the first and second transparent substrates 1 and 2. The moth-eye structure 7 does not contact air, because it is directly adhered to the first sealing member 4, etc. In this case, since the difference in refractive index becomes smaller than when the moth-eye structure 7 is used in an environment exposed to air, the aspect ratio of the micro-optical structure can be reduced, which is desirable.

The moth-eye structure 7 and the first sealing member 4 both have protrusions, offering the advantage of increasing the bonding surface area and thus increasing the bonding strength. Furthermore, in the liquid crystal device 50, the moth-eye structure 7 is provided between the substrates and cannot be touched from the outside. Accordingly, once fabricated, there is no possibility of the micro-optical structure being accidentally damaged, and the liquid crystal device 50 is highly practical in use.

Figure 4:
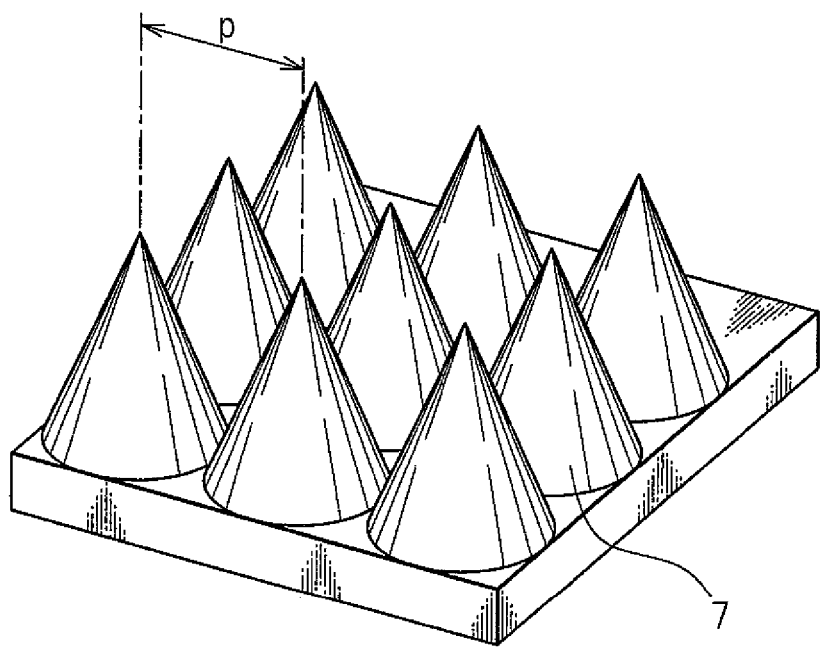
FIG. 4 is a perspective view of a moth-eye structure 7 (a cone-shaped structure).

FIG. 4 is a perspective view of the moth-eye structure 7.

In the liquid crystal device 50, the moth-eye structure 7 as a micro-optical structure is constructed from an array of conical protrusions which are arranged at a pitch, p, approximately equal to or less than one-half wavelength of visible light. In the case of FIG. 4, the pitch, p, is chosen to be 200 nm which is less than one-half of the shortest wavelength 420 nm of visible light.

Figure 5:
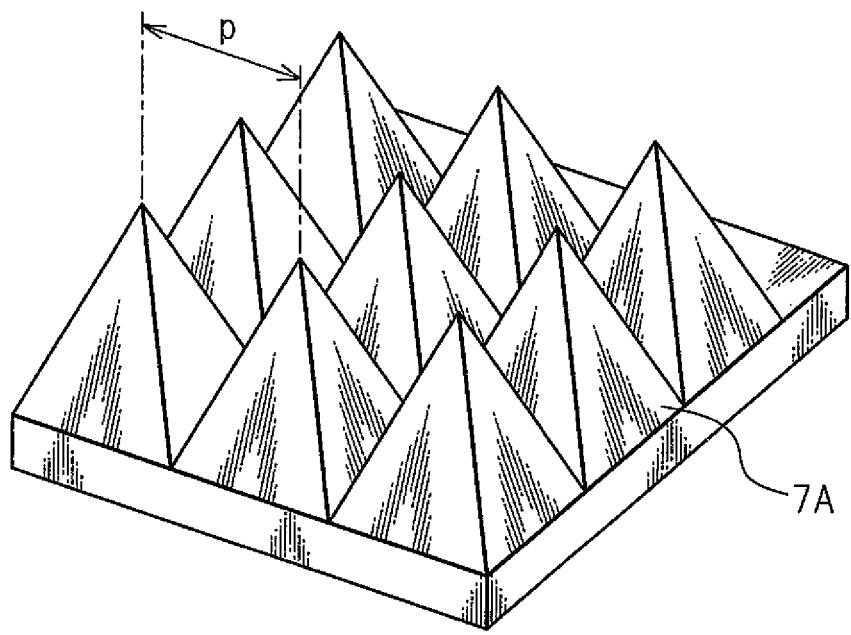
FIG. 5 is a perspective view of an alternative moth-eye structure 7A (a square pyramid-shaped structure).

FIG. 5 is a perspective view of an alternative moth-eye structure 7A.

The moth-eye structure 7A shown in FIG. 5 can be used in the liquid crystal device 50 in place of the moth-eye structure 7 shown in FIG. 4. The moth-eye structure 7A as a micro-optical structure is constructed from an array of square pyramid-shaped protrusions which are arranged at a pitch, p, approximately equal to or less than one-half wavelength of visible light.

Figure 6:
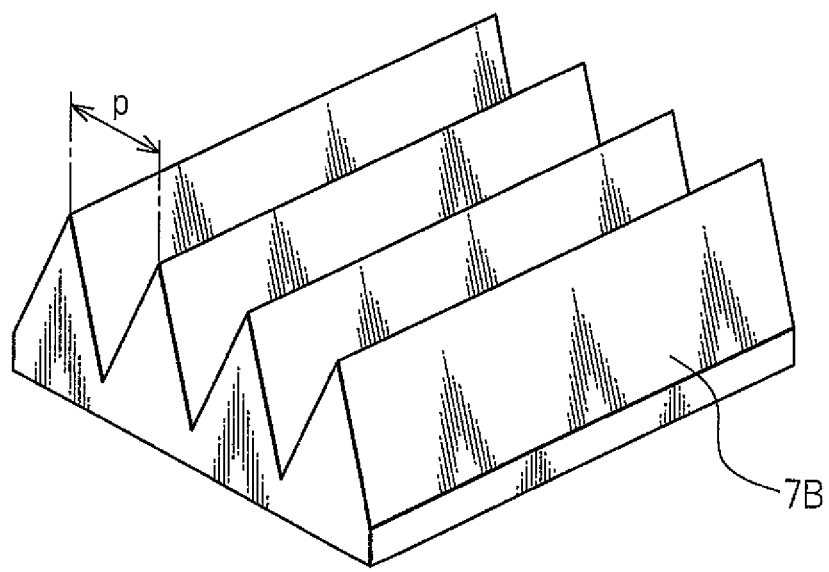
FIG. 6 is a perspective view of a muslin structure.

FIG. 6 is a perspective view of a muslin structure 7B.

The muslin structure 7B shown in FIG. 6 can be used in the liquid crystal device 50 in place of the moth-eye structure 7 shown in FIG. 4. The muslin structure 7B as a micro-optical structure is constructed from an array of continuously formed protrusions, each being triangular in cross section, which are arranged at a pitch, p, approximately equal to or less than one-half wavelength of visible light.

Recently, the structures shown in FIGS. 4 to 6 have been used, for example, for films for suppressing reflection of ambient light on liquid crystal displays or the like; on the other hand, in the liquid crystal device 50, the above structures are utilized to make the shadow invisible that is formed by the bonding interface between the first transparent substrate 1 and the first sealing member 4. The cone-shaped structure (FIG. 4) and the square pyramid-shaped structure (FIG. 5) have been shown above as examples of the moth-eye structure, but other suitable shapes such as a triangular pyramid shape or a pentagonal pyramid shape may be used.

Further, the protrusions of the moth-eye structures shown in FIGS. 4 and 5 and the muslin structure shown in FIG. 6 may be formed in circular arrays or straight line arrays. Furthermore, the protrusions of the moth-eye structures shown in FIGS. 4 and 5 may be formed in such a manner that each row of protrusions is displaced, for example, by half a pitch from its adjacent row.

Figure 7:
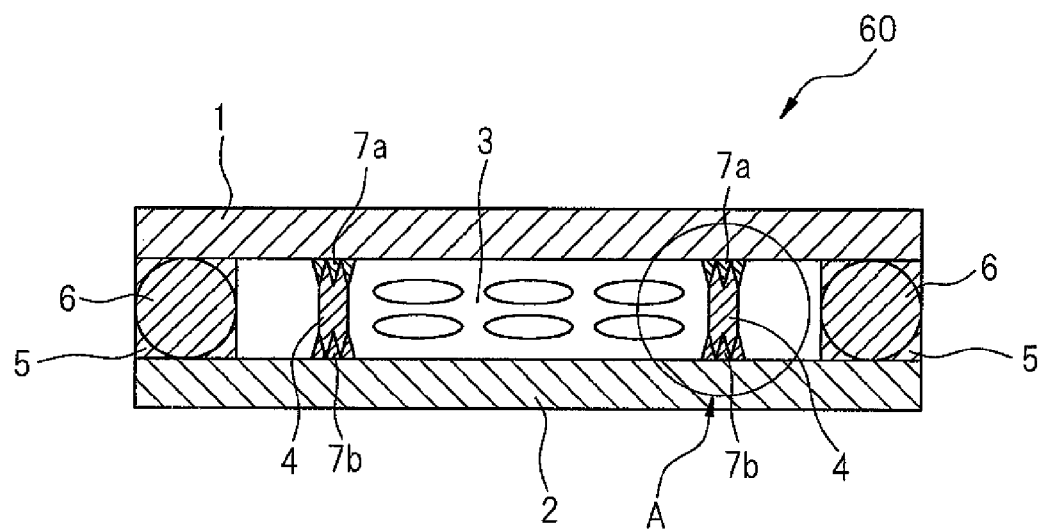
FIG. 7 is a cross-sectional view of an alternative liquid crystal device 60.
Figure 8:
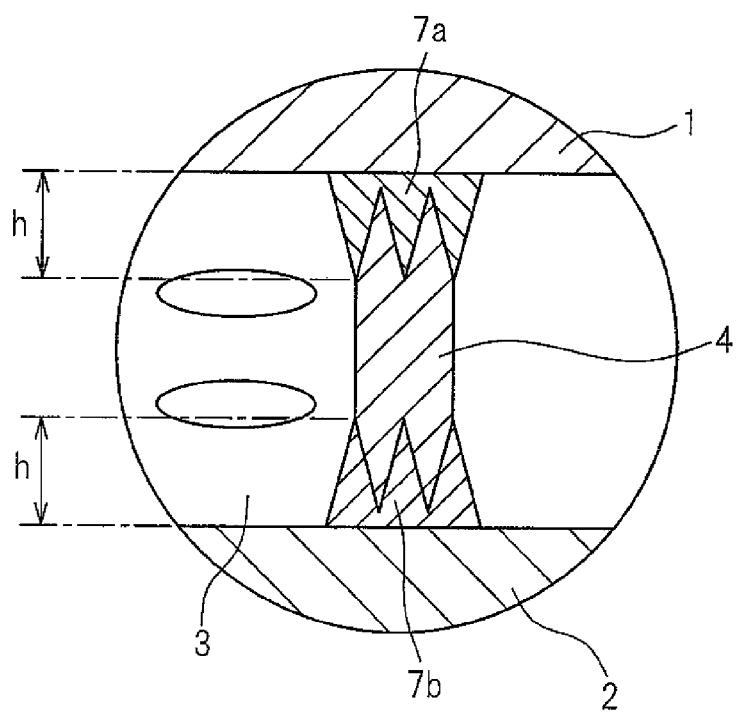
FIG. 8 is an enlarged view of the interface between the first transparent substrate and sealing member and the interface between the sealing member and second transparent substrate indicated at A in FIG. 1.
Figure 9:
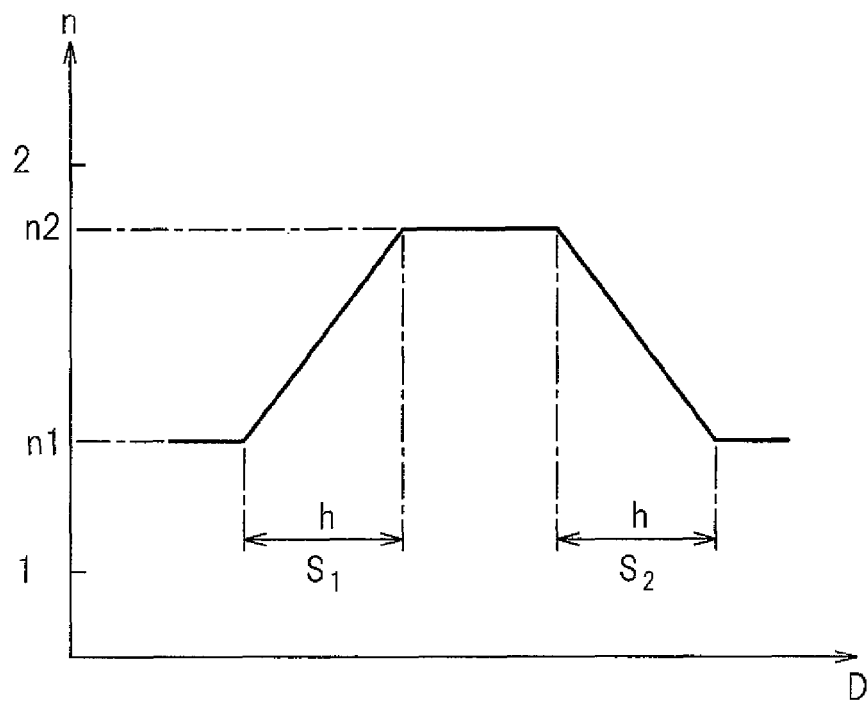
FIG. 9 is a graph depicting how the refractive index changes across the interface between the first transparent substrate and sealing member and across the interface between the sealing member and second transparent substrate shown in FIG. 7.

FIG. 7 is a cross-sectional view of an alternative liquid crystal device 60. FIG. 8 is an enlarged view of a cross section of the bonding interface between the first transparent substrate 1 and the first sealing member 4 and a cross section of the bonding interface between the first sealing member 4 and the second transparent substrate 2 in the liquid crystal device 60 indicated at A in FIG. 7. FIG. 9 is a graph depicting how the refractive index changes across the bonding interface between the first transparent substrate 1 and the first sealing member 4 and across the bonding interface between the first sealing member 4 and the second transparent substrate 2.

In FIGS. 7 and 8, the same component elements as those in FIGS. 1 and 2 are designated by the same reference numerals, and the description of such component elements will not be repeated. The liquid crystal device 60 of FIG. 7 differs from the liquid crystal device 50 of FIG. 1 only in that an additional moth-eye structure 7b is provided between the first sealing member 4 and the second transparent substrate 2. In the liquid crystal device 60, the moth-eye structure 7a is provided between the first transparent substrate 1 and the first sealing member 4. In FIG. 9, the ordinate represents the refractive index (n), and the abscissa represents the distance (D) that the light incident on the first transparent substrate travels until it enters the second transparent substrate by passing through the sealing member.

Next, a description will be given of the optical properties when the moth-eye structures are provided on both sides.

In the liquid crystal device 60, the refractive index of the first transparent substrate 1 is denoted by n1, and the refractive index is constant throughout the first transparent substrate 1. The refractive index of the moth-eye structure 7a is also n1. The refractive index of the first sealing member 4 is denoted by n2, and the refractive index is constant throughout the first sealing member 4. The refractive index of the moth-eye structure 7b is n1. The refractive index of the second transparent substrate 2 is denoted by n1, and the refractive index is constant throughout the second transparent substrate 2.

Visible light incident on the first transparent substrate 1 passes through the first transparent substrate 1 of refractive index n1, then through the moth-eye structure 7a which is a micro-optical structure of refractive index n1, and then enters the first sealing member 4 of refractive index n2. A smooth refractive index gradient transitioning from the refractive index n1 to the refractive index n2 is formed across the protrusion height h (shown as section S1) of the moth-eye structure 7a, thus exhibiting a nonreflective property at the bonding interface between the first transparent substrate 1 and the first sealing member 4. The visible light further passes through the first sealing member 4 of refractive index n2, then through the moth-eye structure 7b which is a micro-optical structure of refractive index n1, and through the second transparent substrate 2 of refractive index n1, and then emerges from the liquid crystal device 60. A smooth refractive index gradient transitioning from the refractive index n2 to the refractive index n1 is formed across the second protrusion height h (shown as section S2), thus exhibiting a nonreflective property at the bonding interface between the first sealing member 4 and the second transparent substrate 2. As a result, in the liquid crystal device 60, the shadows of the bonding interfaces on both the first transparent substrate 1 and the second transparent substrate 2 are invisible, serving to further enhance the transparency of the liquid crystal device 60.

Figure 10:
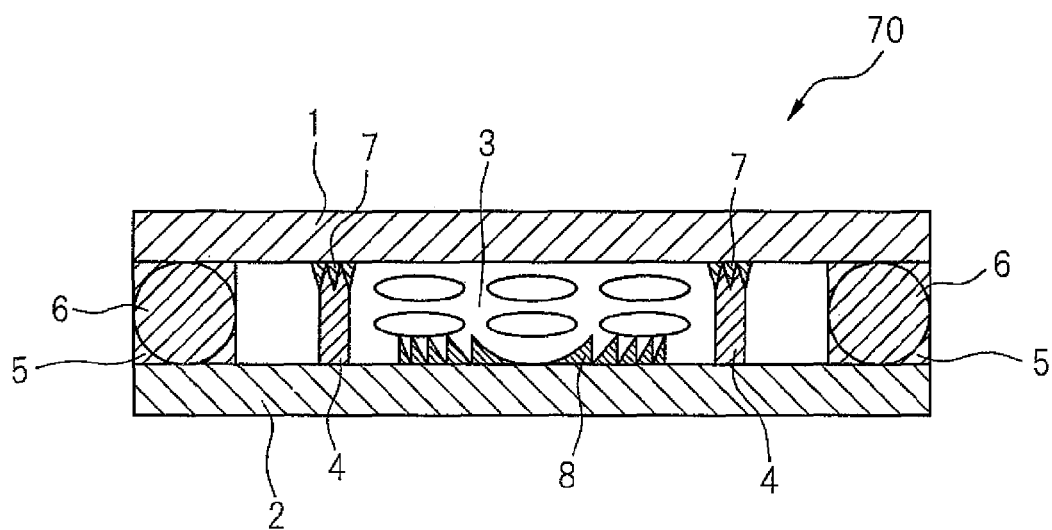
FIG. 10 is a cross-sectional view of a further alternative liquid crystal device 70.

FIG. 10 is a cross-sectional view of a further alternative liquid crystal device 70.

In FIG. 10, the same component elements as those of the liquid crystal device 50 shown in FIG. 1 are designated by the same reference numerals, and the description of such component elements will not be repeated. The liquid crystal device 70 of FIG. 10 differs from the liquid crystal device 50 of FIG. 1 in that an optical structure 8 is provided on the second transparent substrate 2 within the liquid crystal layer 3 sealed by the first sealing member 4.

The optical structure 8 is a Fresnel lens. The liquid crystal layer 3 functions as a lens by changing the orientation of liquid crystals with an applied voltage. Provisions may be made to control the transmission/non-transmission of visible light by turning the applied voltage on and off to the liquid crystal layer 3.

Since the liquid crystal device 70 provided with the optical structure 8 exhibits a nonreflective property at the bonding interface between the first transparent substrate 1 and the first sealing member 4, the otherwise visible shadow becomes invisible, as in the case of the liquid crystal device 50, thus serving to enhance the transparency of the liquid crystal device 70.

Figure 11:
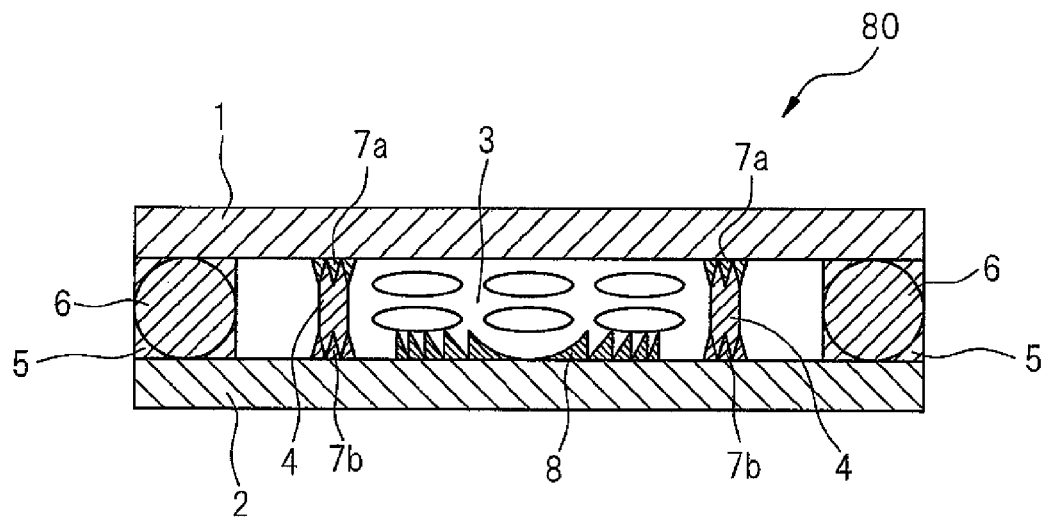
FIG. 11 is a cross-sectional view of a further alternative liquid crystal device 80.

FIG. 11 is a cross-sectional view of a further alternative liquid crystal device 80.

In FIG. 11, the same component elements as those of the liquid crystal device 60 shown in FIG. 7 are designated by the same reference numerals, and the description of such component elements will not be repeated. The liquid crystal device 80 of FIG. 11 differs from the liquid crystal device 60 of FIG. 7 in that an optical structure 8 is provided on the second transparent substrate 2 within the liquid crystal layer 3 sealed by the first sealing member 4.

The optical structure 8 is a Fresnel lens. The liquid crystal layer 3 functions as a lens by changing the orientation of liquid crystals with an applied voltage. Provisions may be made to control the transmission/non-transmission of visible light by turning the applied voltage on and off to the liquid crystal layer 3.

Since the liquid crystal device 80 provided with the optical structure 8 exhibits a nonreflective property not only at the bonding interface between the first transparent substrate 1 and the first sealing member 4 but also at the bonding interface between the second transparent substrate 2 and the first sealing member 4, the otherwise visible shadows are invisible, as in the case of the liquid crystal device 60, thus serving to further enhance the transparency of the liquid crystal device 80.

Figure 12:
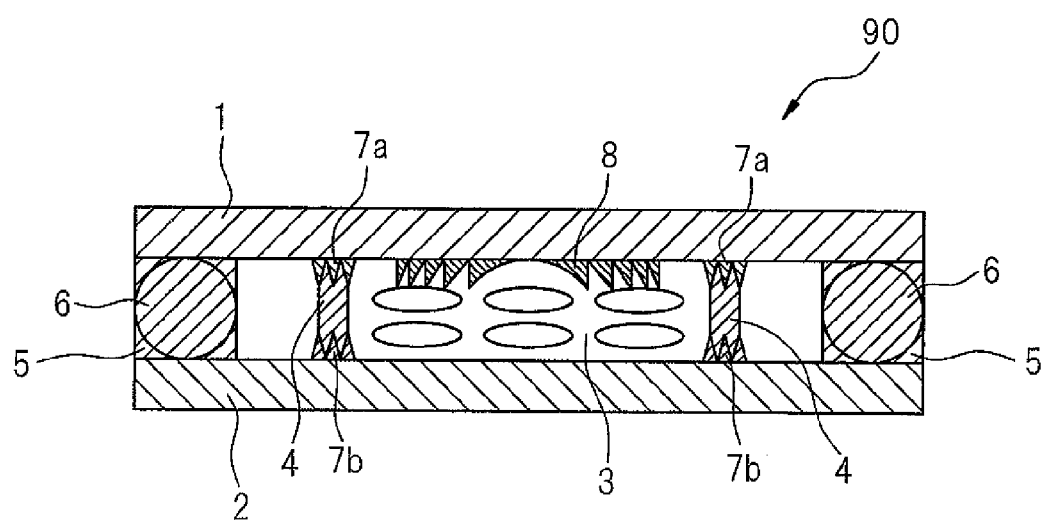
FIG. 12 is a cross-sectional view of a further alternative liquid crystal device 90.
Figure 13A:
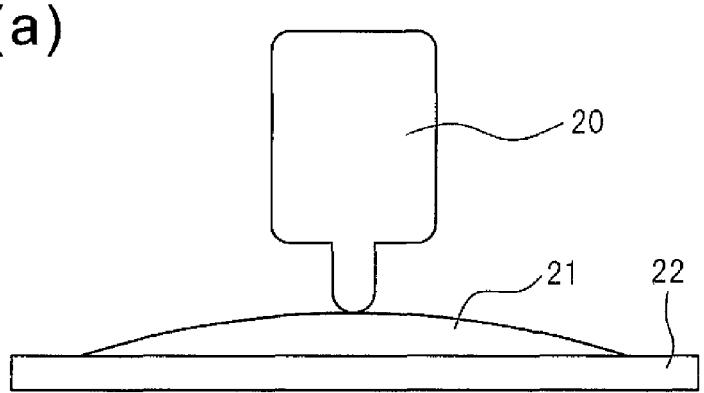
FIG. 13(*a*) is a diagram for explaining a substrate fabrication process.
Figure 13B:
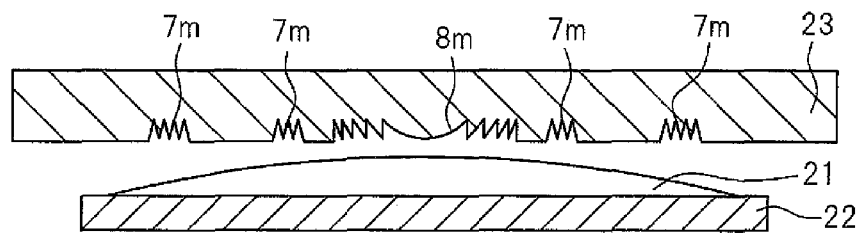
Figure 13C:
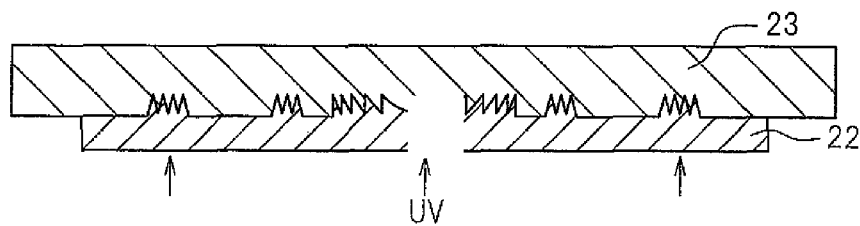
Figure 13D:
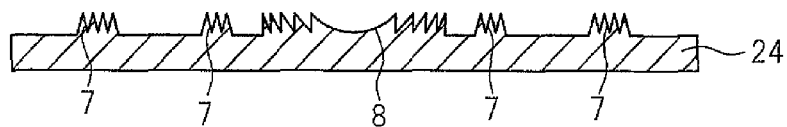

FIG. 12 is a cross-sectional view of a further alternative liquid crystal device 90.

In FIG. 12, the same component elements as those of the liquid crystal device 60 shown in FIG. 7 are designated by the same reference numerals, and the description of such component elements will not be repeated. The liquid crystal device 90 of FIG. 12 differs from the liquid crystal device 60 of FIG. 7 in that an optical structure 8 is provided on the first transparent substrate 1 within the liquid crystal layer 3 sealed by the first sealing member 4.

The optical structure 8 is a Fresnel lens. The liquid crystal layer 3 functions as a lens by changing the orientation of liquid crystals with an applied voltage. Provisions may be made to control the transmission/non-transmission of visible light by turning the applied voltage on and off to the liquid crystal layer 3.

Since the liquid crystal device 90 provided with the optical structure 8 exhibits a nonreflective property not only at the bonding interface between the first transparent substrate 1 and the first sealing member 4 but also at the bonding interface between the second transparent substrate 2 and the first sealing member 4, the otherwise visible shadows are invisible, as in the case of the liquid crystal device 60, thus serving to further enhance the transparency of the liquid crystal device 90.

In the liquid crystal device 90 shown in FIG. 12, the moth-eye structures 7a and 7b have been provided on the first and second transparent substrates 1 and 2, respectively, but the moth-eye structure may be provided only on one or the other of the substrates.

In the liquid crystal device 90 shown in FIG. 12, since the optical structure 8 is provided on the first transparent substrate 1, a parallel beam of light incident on the first transparent substrate 1 is refracted through the Fresnel lens and further refracted through the second transparent substrate 2; as a result, the lens power is distributed between the two substrates, achieving the effect of reducing the amount of aberration. The optical structure 8 may be provided on the first transparent substrate 1 or on the second transparent substrate 2, since it does not make any difference in practice.

In the liquid crystal devices 70, 80, and 90 shown in FIGS. 10, 11, and 12, the optical structure 8 has been constructed as a Fresnel lens, but the optical structure 8 may be constructed as a microlens or as an optical structure of some other suitable form.

In the liquid crystal devices 50, 60, 70, 80, and 90 described above, the side on which the first transparent substrate 1 is located is the viewing side.

Next, a fabrication process for the liquid crystal device will be described.

FIGS. 13(*a*) to 13(*d*) are diagrams for explaining a substrate fabrication process.

In the process shown in FIG. 13, the optical structure 8 and the moth-eye structures are formed simultaneously by imprint molding on the first transparent substrate 1 or the second transparent substrate 2. In FIG. 13, only the essential steps of the substrate fabrication process are shown, and the steps up to the completion of the liquid crystal device are omitted.

In FIG. 13(*a*), a substrate 22 to be fabricated as the first transparent substrate 1 or the second transparent substrate 2 is placed in position, and a photo-curable resin 21 is dripped in a prescribed amount from a dispenser 20 onto the substrate 22.

Next, in FIG. 13(*b*), the photo-curable resin 21 is formed into a given shape by pressing a mold 23 onto the substrate 22. The mold 23 is formed with a mold shape 8*m* corresponding to the optical structure 8 and mold shapes 7*m* corresponding to the moth-eye structures 7.

Then, in FIG. 13(*c*), ultraviolet rays (UV) are radiated from below the substrate 22, causing the photo-curable resin 21 to cure.

In FIG. 13(*d*), the mold 23 is removed to complete the fabrication of an imprint-molded substrate 24. The imprint-molded substrate 24 can be used as the first transparent substrate 1 or the second transparent substrate 2 to construct the liquid crystal device.

By employing the fabrication method shown in FIG. 13, the optical structure 8 and the moth-eye structures 7 can be formed from the same material in a single process step, achieving the formation of the moth-eye structures 7 as micro-optical structures with little extra cost. In this way, a highly transparent liquid crystal device free from the shadow of the bonding interface with the first sealing member 4 can be provided at low cost. As the photo-curable resin 21, it is preferable to use a resin whose refractive index after curing is close to the refractive index of the substrate 22. If the refractive index of the photo-curable resin 21 after curing is close to the refractive index of the substrate 22, the nonreflective property at the bonding interface with the sealing member further improves, which is desirable. The material of the substrate 22 may be glass or a resin. While FIG. 13 has shown the method of fabricating the optical structure 8 and the moth-eye structures 7, the fabrication method shown in FIG. 13 can also be applied when fabricating the optical structure 8 and the muslin structures (see FIG. 6).

Figure 14A:
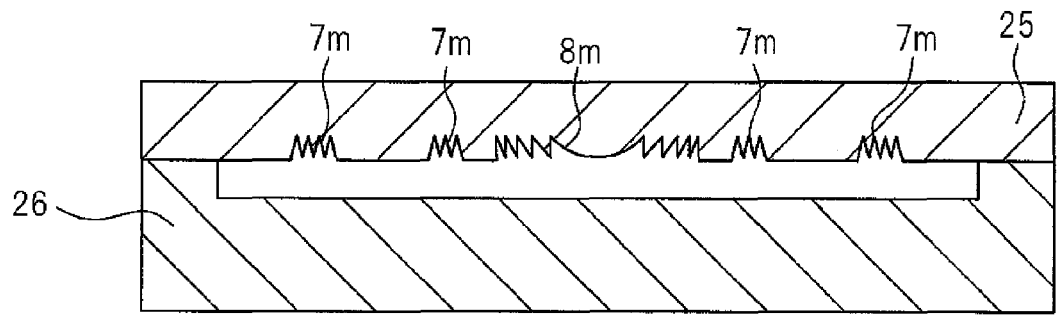
FIG. 14(*a*) is a diagram for explaining an alternative substrate fabrication process.
Figure 14B:
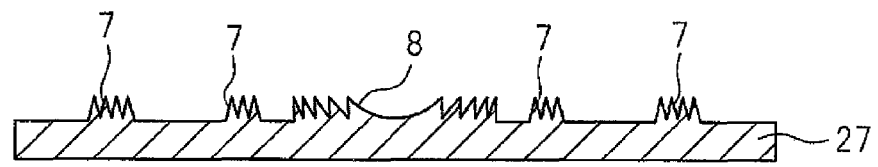

FIGS. 14(*a*) and 14(*b*) are diagrams for explaining an alternative substrate fabrication process.

In the process shown in FIG. 14, the optical structure 8 and the moth-eye structures 7 are formed simultaneously with the first or second transparent substrate 1 or 2 by injection molding. In FIG. 14, only the essential steps of the substrate fabrication process are shown, and the steps up to the completion of the liquid crystal device are omitted.

In FIG. 14(*a*), an upper injection mold 25 and a lower injection mold 26 are attached to an injection molding machine not shown. The injection molding machine injects a prescribed amount of resin through a nozzle not shown into the cavities of the molds 25 and 26 under a prescribed pressure and a prescribed temperature for a prescribed time.

Next, after cooling for a prescribed time, the upper injection mold 25 and the lower injection mold 26 are opened, and the injection molded substrate 27 is removed (see FIG. 14(*b*)). The removed injection molded substrate 27 is subjected to further processing, cleaning, etc., if necessary; the substrate 27 thus fabricated can be used as the first transparent substrate 1 or the second transparent substrate 2 to construct the liquid crystal device.

According to the fabrication process shown in FIG. 14, the substrate 27 to be used as the first or second transparent substrate 1 or 2, the optical structure 8, and the moth-eye structures 7 can be formed from the same material in a single process step. By thus forming the first or second transparent substrate 1 or 2 in the desired shape, the nonreflective property at the bonding interface between the substrate and the sealing member improves, and a highly transparent liquid crystal device can be provided at low cost. In the case of the integrally molded substrate 27, since the refractive index of the moth-eye structures 7 is identical to the refractive index of the substrate 27, the nonreflective property at the bonding interface with the first sealing member 4 greatly improves, which is desirable. While FIG. 14 shows the method of fabricating the substrate, the optical structure, and the moth-eye structures, the fabrication method shown in FIG. 14 can also be applied when fabricating the resin, the optical structure, and the muslin structures (see FIG. 6).

Figure 15:
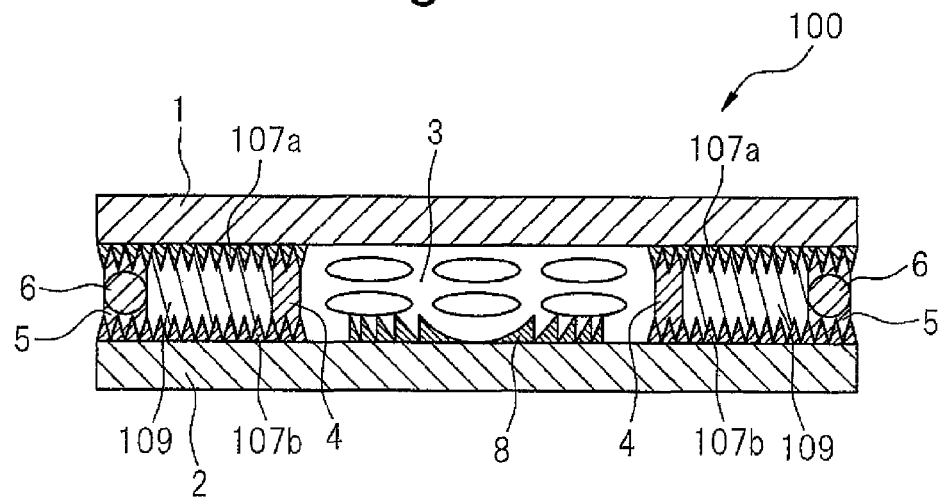
FIG. 15 is a cross-sectional view of a further alternative liquid crystal device 100.

FIG. 15 is a cross-sectional view of a further alternative liquid crystal device 100.

In FIG. 15, the same component elements as those of the liquid crystal device 80 shown in FIG. 11 are designated by the same reference numerals, and the description of such component elements will not be repeated here. The liquid crystal device 100 of FIG. 15 differs from the liquid crystal device 80 of FIG. 11 in that the moth-eye structures 7 are also provided in the region located outside the first sealing member 4 and sandwiched between the first and second transparent substrates 1 and 2.

In FIG. 15, the moth-eye structures 107*a* and 107*b* are formed on the first and second transparent substrates 1 and 2, respectively, over the entire surfaces thereof located within the region extending outwardly from the portion bonded by the first sealing member 4 and leading to the portion bonded by the second sealing member 5. A filling resin 109 is sealed in the space between the first sealing member 4 and the second sealing member 5.

The moth-eye structures 107*a* and 107*b* each have substantially the same shape as that of the moth-eye structure described with reference to FIG. 4. However, the moth-eye structures 107*a* and 107*b* may each be formed in substantially the same shape as that of the moth-eye structure described with reference to FIG. 5. Alternatively, the moth-eye structures 107*a* and 107*b* may each be formed in substantially the same shape as that of the muslin structure described with reference to FIG. 6.

Further, the moth-eye structures 107*a* and 107*b* provided on the respective substrates may be identical in structure or different in structure.

In the liquid crystal device 100, the moth-eye structures are provided over the entire area in the space sandwiched between the first and second transparent substrates 1 and 2, except the space where the liquid crystal layer 3 is formed.

Accordingly, the visible light that is incident on the first transparent substrate 1 and that passes through the region outside the liquid crystal layer 3 invariably passes through the moth-eye structure 107a or 107b. As a result, the liquid crystal device exhibits nonreflective properties over the entire outside region including the bonding interface with the first sealing member 4, and can thus achieve a high degree of transparency over a wider range. The liquid crystal device 100 can be fabricated by using the fabrication method earlier described with reference to FIG. 13 or 14.

Next, a description will be given of the liquid crystal device 100 as applied to an eyeglass.

Figure 16:
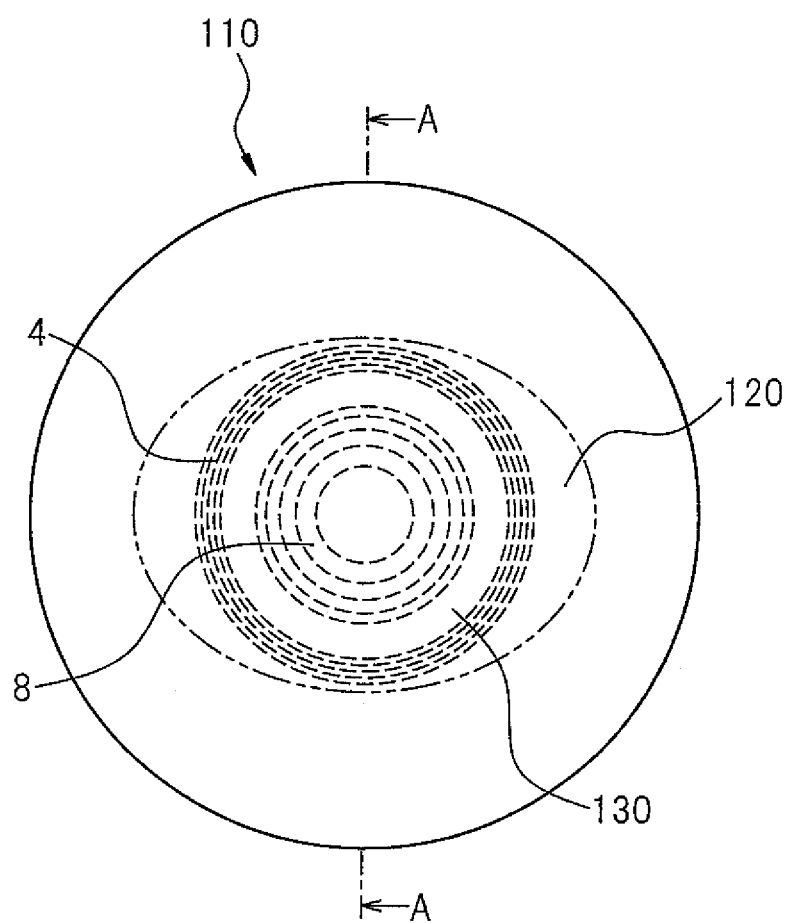
FIG. 16 is a plan view of a finished lens 110 fabricated based on the liquid crystal device 100 shown in FIG. 15.
Figure 17:
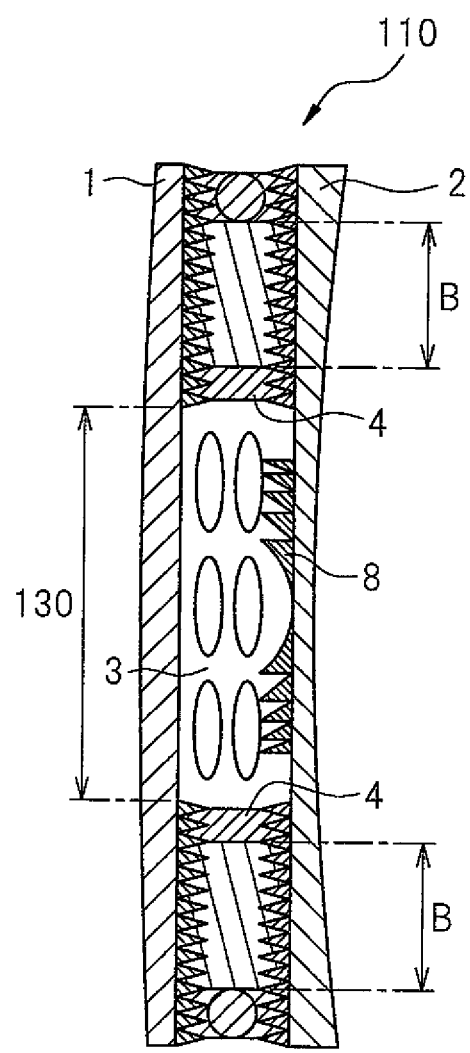
FIG. 17 is a cross-sectional view taken along line A-A of the finished lens 110 shown in FIG. 16.

FIG. 16 is a plan view of a finished lens 110 fabricated based on the liquid crystal device 100 shown in FIG. 15. FIG. 17 is a cross-sectional view taken along line A-A of the finished lens 110 shown in FIG. 16.

It is assumed here that the liquid crystal device 100 shown in FIG. 15 includes the first and second transparent substrates 1 and 2 that are formed in a disc-like shape but not yet ground or polished at all. The first and second transparent substrates 1 and 2 are thereafter ground and polished to the desired lens form, as shown in FIG. 17; the lens thus generated will hereinafter be called the "finished lens." The lens generated by cutting the "finished lens" to fit the shape of the eyeglass frame will hereinafter be referred to as the "edged lens."

In FIG. 16, the oval portion enclosed by a two-dot dashed line corresponds to the edged lens 120 which is generated by processing the finished lens 110 to fit the shape of the eyeglass frame. The shape of the edged lens 120 is not limited to an oval shape, but may be any shape that fits the shape of the eyeglass frame. It is preferable to set the region B (indicated in FIG. 17) as the region to be edged when generating the edged lens 120. The region B is the region located outside the first sealing member 4 and inside the second sealing member 5. Since the second sealing member 5 contains the spacers 6, it is preferable to remove it by cutting.

In FIG. 17, a transparent electrode (not shown) is formed on each of the first and second transparent substrates 1 and 2 in corresponding relationship to each blaze of the Fresnel lens 8 constructed as the optical structure. The first transparent substrate 1, the second transparent substrate 2, the transparent electrodes, and the liquid crystal layer 3 together constitute the liquid crystal lens structure 130.

In the finished lens 110 shown in FIG. 17, the side on which the first transparent substrate 1 is located is the viewing side. The this also applies for the edged lens 120 generated by cutting the finished lens 110.

Figure 18:
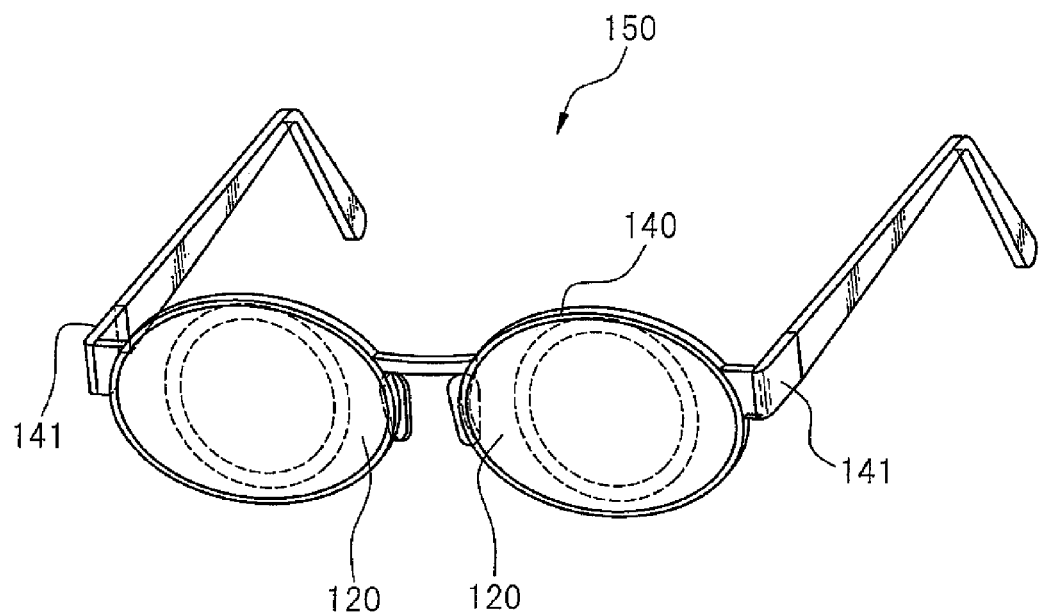
FIG. 18 is a perspective view of liquid crystal eyeglasses 150 fabricated by mounting a pair of edged lenses 120 to an eyeglass frame 140.
Figure 19:
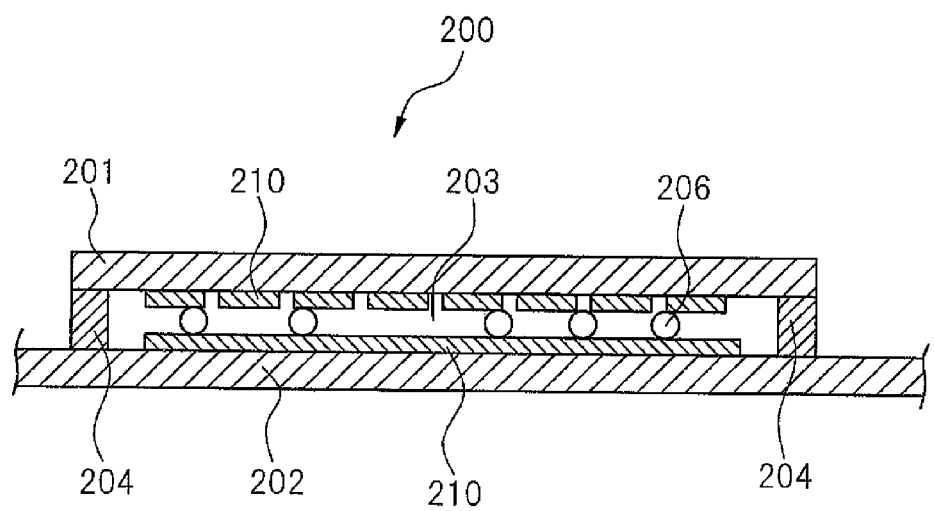
FIG. 19 is a cross-sectional view of a prior art liquid crystal device.

FIG. 18 is a perspective view of liquid crystal eyeglasses 150 fabricated by mounting a pair of edged lenses 120 to an eyeglass frame 140.

In the liquid crystal eyeglasses 150, the edged lenses 120 are mounted in the eyeglass frame 140. When each edged lens 120 is mounted to the eyeglass frame 140, connecting lines (not shown) connected to the transparent electrodes (not shown) in the liquid crystal lens structure 130 are connected to the connectors (not shown) contained in an end piece 141. The edged lens 120 has a structure such that external connections can be made as long as the lens is generated by edging the region B outside the first sealing member 4. A power supply (not shown) is built into the end piece 141 so that a prescribed power can be supplied to the transparent electrodes in the liquid crystal lens structure 130 via the connectors. The voltage supply can be turned on and off by a switch provided on the end piece 141. In FIG. 18, the sealing member 4 in the edged lens 120 is shown by dashed lines for convenience, but actually it is transparent and invisible.

For example, the edged lens 120 may be designed to have a lens form that provides power to focus on a distant object so that when the liquid crystal lens structure 130 is inoperative, the liquid crystal eyeglasses 150 function as eyeglasses for distance viewing. Then, when a prescribed voltage is applied between the transparent electrodes in the liquid crystal lens structure 130, causing the liquid crystal lens structure 130 to operate so as to provide the power that the Fresnel lens 8 has, the liquid crystal eyeglasses 150 function as eyeglasses for near viewing. The eyeglasses can be switched between distance viewing power and near viewing power by operating the switch used to control the power supply.

In prior art liquid crystal eyeglasses, shadows are visible at the portions bonded by the sealing member, etc., which not only degrades the appearance but also distracts the user. There is therefore a need to provide eyeglasses having a high degree of transparency over as wide a range as possible.

In the liquid crystal eyeglasses 150 having the liquid crystal lens structure 130 described above, the moth-eye structures 107a and 107b are provided over the entire area in the space defined between the first and second transparent substrates 1 and 2 and located outside the liquid crystal layer 3. Accordingly, the visible light that is incident on the first transparent substrate 1 and that passes through the region outside the liquid crystal layer 3 invariably passes through the moth-eye structure 7a or 7b. This achieves nonreflective properties over a wider range, making it possible to provide electronic eyeglasses 150 having a higher degree of transparency.

What is claimed is:
1. A liquid crystal device comprising:
   a first substrate disposed on a viewing side;
   a second substrate disposed opposite said first substrate;
   a sealing member disposed between said first substrate and said second substrate;
   a liquid crystal layer provided between said first substrate and said second substrate and sealed by said sealing member; and
   a muslin structure or moth-eye structure placed between said first substrate and said sealing member,
   wherein the muslin structure or moth-eye structure has a refractive index gradient transitioning from a refractive index n1 of said first substrate to a refractive index n2 of said sealing member.

2. The liquid crystal device according to claim 1, further comprising an additional muslin structure or moth-eye structure which is placed between said sealing member and said second substrate.

3. The liquid crystal device according to claim 1, further comprising an optical structure which is provided on said first substrate or said second substrate on a side thereof that faces said liquid crystal layer.

4. The liquid crystal device according to claim 3, wherein said optical structure is formed from the same resin material as said muslin structure or moth-eye structure.

5. The liquid crystal device according to claim 1, wherein said first substrate or said second substrate is a resin substrate, and said muslin structure or moth-eye structure is formed by processing said resin substrate.

6. The liquid crystal device according to claim 1, wherein said muslin structure or moth-eye structure is formed integrally with said first substrate or said second substrate.

7. The liquid crystal device according to claim 1, further comprising an additional muslin structure or moth-eye structure which is provided in a region defined between said first substrate and said second substrate and located outside said sealing member.

* * * * *